Feb. 9, 1943.   C. T. LANGMAID   2,310,532
FASTENING AND LOCATING DEVICE
Filed Nov. 15, 1941
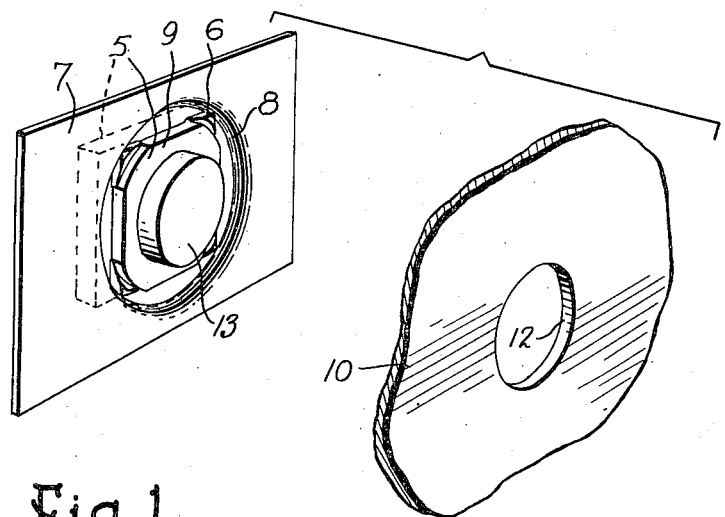
Fig.1.
Fig.2.
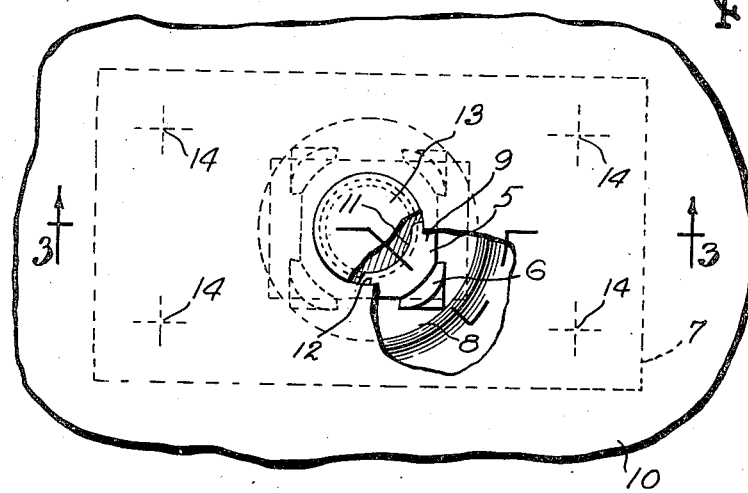
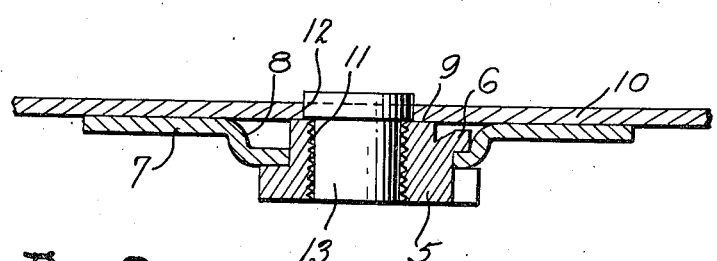
Fig.3.
INVENTOR.
Charles T. Langmaid
BY Edward M. Apple
Attorney Patented Feb. 9, 1943

2,310,532

UNITED STATES PATENT OFFICE 2,310,532

FASTENING AND LOCATING DEVICE

Charles T. Langmaid, Detroit, Mich.

Application November 15, 1941, Serial No. 419,266

4 Claims. (Cl. 85—32)

This invention relates broadly to fastening devices and has particular reference to the art in which threaded elements, such as nuts, are secured to certain members by clinching or welding, preliminary to having other members attached thereto by means of bolts which engage the threaded elements, to effect the assembly of the various parts.

In the production of automobiles, refrigerators, washing machines, stoves, furnaces and the like such fastening devices are used extensively. In practice it is customary to punch holes in the metal at predetermined places and insert therein nuts which can be secured to the metal by clinching or welding.

In rapid production methods it is often times difficult to properly locate the nuts in the holes in the time allotted, so that often times a hole is not provided with a nut, or the nut is not centered properly so that it is difficult if not impossible to insert a bolt later. This might cause the rejection of an entire part assembly and thus cause the disruption of a complete production operation.

In almost all operations the nuts are attached to the parts before the parts are finished, and often times the parts are finished before final assembly, so that much difficulty is encountered in the final assembly when paint or other finishing materials clog the nut threads and prevent or retard the entry of the bolts.

Again in operations where the nuts are welded directly to the parts the heat of welding often times cracks or misshapes the nuts, or weld flash ruins the threads and makes it impossible to retap them because of the hardness, all of which results in the rejection of parts and the slowing down of operations.

It is an object therefore of this invention to obviate the foregoing difficulties and to generally improve such operations.

It is a further object of the invention to provide a device which will greatly assist in the proper location of the nuts, and protect the thread area thereof during the attaching and finishing operations.

The foregoing and other objects and advantages of the invention will become more apparent as the description proceeds, reference being made from time to time to the accompanying drawing, in which:

Fig. 1 is a perspective view of my device ready to be located and secured to another element.

Fig. 2 is a plan view with parts broken away of the elements shown in Fig. 1 after they are located and attached.

Fig. 3 is a section taken substantially on the line 3—3 of Fig. 2.

Referring now more particularly to the drawing it will be understood that in the embodiment herein disclosed (Fig. 1), the reference character 5 indicates a flanged nut which is clinched as at 6, to a plate like member 7, as is well known in the art. The plate 7, which can be of any desired shape and size, is provided with a recess 8, which permits the upper face 9 of the nut 5 to lie flush against the member 10 to which it is to be attached.

In order to protect the thread area 11 of the nut 5 and provide a proper means for locating the nut 5, with respect to the aperture 12, of the member 10, I provide a plug 13, which may be made of hard wood, a plastic, or other suitable maerial, and which is press fitted into the nut 5. The end of the plug 13 which engages the aperture 12 must have sufficient diameter to fill the aperture 12, and its center must coincide with the center of that portion which extends into the thread area of the nut 5 so that proper alignment of the nut is accomplished. When the plug 13 is in proper engagement with the aperture 12, the plate 7 is then spot welded as at 14 (Fig. 1), to the member 10. The parts may then be painted or otherwise finished, after which the plug 13 is removed by means of a punch or drift, and another member can be attached to the member 10 by inserting a bolt into the clean thread area of the nut 5.

Having described my invention what I claim and desire to protect by Letters Patent is:

1. A fastening and locating device comprising a threaded element secured to a plate-like member, a removable plug of softwood or other destructible material in said threaded element, said plug having a portion extending beyond the surface of said plate, and an apertured member welded to said plate-like member, the aperture of said member being in engagement with the extended portion of said plug, said plug being adapted to be driven from said threaded element after said apertured member and said plate-like member are welded together.

2. The device defined in claim 1, in which the extended portion of said plug is of the same diameter as the aperture of said apertured member, and the axis of said extended portion is in alignment with the axis of said threaded element.

3. The combination of a plate-like member, a clinch nut secured thereto, a removable plug of wood or like material in the thread area of said clinch nut, said plug having a portion extending beyond the surface of said plate, and a member secured to said plate by welding or the like, said member having an aperture in close fitting engagement with the extended portion of said plug, and said plug being adapted to be expelled from said clinch nut after the apertured member and plate are welded together.

4. The combination defined in claim 3, in which the extended portion of said plug is of different size than the rest of said plug, and the axis of said extended portion is in alignment with the axis of the opening in said clinch nut.

CHARLES T. LANGMAID.